US008556570B2

(12) United States Patent
Ishihara

(10) Patent No.: US 8,556,570 B2
(45) Date of Patent: Oct. 15, 2013

(54) SMOKE AND FUME REMOVAL ASSEMBLY WITH DUAL SUCTION MODES

(75) Inventor: Toshinobu Ishihara, Hyogo-ken (JP)

(73) Assignee: Hakko Corporation, Osaka (JP)

( * ) Notice: Subject to any disclaimer, the term of this patent is extended or adjusted under 35 U.S.C. 154(b) by 269 days.

(21) Appl. No.: 12/788,206

(22) Filed: May 26, 2010

(65) Prior Publication Data
US 2010/0300292 A1    Dec. 2, 2010

Related U.S. Application Data

(60) Provisional application No. 61/182,568, filed on May 29, 2009.

(51) Int. Cl.
F04D 29/44    (2006.01)

(52) U.S. Cl.
USPC .............................. 415/1; 415/154.1; 415/183

(58) Field of Classification Search
USPC ......... 415/93, 101, 182.1, 183, 219.1, 220, 1, 415/154.1; 416/244 R, 246
See application file for complete search history.

(56) References Cited

U.S. PATENT DOCUMENTS

| 3,804,942 | A | * | 4/1974 | Kato et al. ................. 423/239.1 |
| 3,960,527 | A | * | 6/1976 | Goettl ......................... 55/418.1 |
| 4,092,136 | A | | 5/1978 | Zimbardi |
| 4,377,399 | A | | 3/1983 | Bryson |
| 4,385,911 | A | | 5/1983 | Popeil et al. |
| 4,434,711 | A | | 3/1984 | Zboralski et al. |
| 4,868,369 | A | | 9/1989 | Chen |
| 5,268,012 | A | | 12/1993 | Jang |
| 5,470,365 | A | * | 11/1995 | Jang ............................... 55/510 |
| 5,624,309 | A | | 4/1997 | Schuepstuhl et al. |
| 5,701,045 | A | * | 12/1997 | Yokozawa et al. ............. 310/62 |
| 6,238,181 | B1 | * | 5/2001 | Chen ............................. 415/175 |
| D448,839 | S | | 10/2001 | Mishin et al. |
| 6,554,174 | B1 | | 4/2003 | Aceves |
| 6,663,698 | B2 | | 12/2003 | Mishin et al. |
| 6,776,708 | B1 | | 8/2004 | Daoutis et al. |
| 7,443,670 | B2 | * | 10/2008 | Nishi et al. .................... 361/695 |

FOREIGN PATENT DOCUMENTS

| DE | 31 26 690 | 10/1982 |
| DE | 198 10 818 | 9/1999 |
| EP | 0 401 436 | 12/1990 |

(Continued)

OTHER PUBLICATIONS

Smoke Absorber, Hakko Web Catalog, 4 pgs. (2008).

(Continued)

Primary Examiner — Nathaniel Wiehe
Assistant Examiner — Ryan Ellis
(74) Attorney, Agent, or Firm — Squire Sanders (US) LLP

(57) ABSTRACT

A fan assembly is adjustable between two suction modes by alternating the position of the fan assembly on a flat surface, such as a table top. The fan assembly has two separate suction openings, one smaller than the other, which are selectively sealed by the flat surface. The suction openings are bounded by planar edges of an air guide that protrudes outward from a fan casing of the assembly. In one position, a first suction opening is unobstructed by the flat surface while the second suction opening is either partially obstructed or substantially sealed by the flat surface. In another position, the second suction opening is unobstructed by the flat surface while the first suction opening is substantially sealed by the flat surface.

17 Claims, 8 Drawing Sheets

(56) References Cited

FOREIGN PATENT DOCUMENTS

| | | |
|---|---|---|
| EP | 0 440 090 | 8/1991 |
| FR | 2 128 042 | 10/1972 |
| JP | S62-135043 | 8/1987 |
| JP | S63-181741 | 11/1988 |
| JP | 2150646 | 6/1990 |
| JP | 11-038328 | 2/1999 |

OTHER PUBLICATIONS

Weller Volume Extraction System, Cooper Hand Tools, 8 pgs. (2007).

* cited by examiner

SMOKE AND FUME REMOVAL ASSEMBLY WITH DUAL SUCTION MODES

CROSS-REFERENCE TO RELATED APPLICATION

This application claims the benefit of U.S. Provisional Application No. 61/182,568, filed May 29, 2009, which is incorporated herein by reference in its entirety.

FIELD OF THE INVENTION

This invention relates generally to a fan assembly and, more particularly, to a portable fan assembly for removing smoke and fumes from a soldering work station.

BACKGROUND OF THE INVENTION

Although automated soldering is widespread, a significant number of soldering tasks must still be done manually. With manual soldering, it necessary to prevent the accumulation of smoke and fumes from work stations occupied by workers. The amount and concentration of smoke and fumes can vary depending on the type and volume of manual soldering tasks. Fans have been used to remove smoke and fumes, but conventional fans are often not suited for a broad range of situations. In some work conditions, smoke and fumes are generated close to a fan, so a low amount of suction is needed. In other work conditions, a greater amount of suction is needed to remove smoke and fumes generated far from the fan. Fan rotation speed may be increased to create greater suction, but this may significantly increase the amount of noise from the fan. Also, smoke and fumes can be concentrated and may be removed more efficiently with a fan having a relatively small suction opening. Furthermore, smoke and fumes can be widely dispersed and may be removed more efficiently with a fan having a large suction opening for moving a greater volume of air.

Accordingly, there is a need for a fan assembly that has more than one mode of operation to allow efficient removal of smoke and fumes in a variety of work conditions. There is also a need for a fan assembly that can easily be adjusted to operate in different modes. There is a need to accomplish such adjustment without complex mechanisms and electronic circuitry. Such mechanisms and electronic circuitry increase manufacturing costs and are subject to failure over time.

SUMMARY OF THE INVENTION

Briefly and in general terms, the present invention is directed to a fan assembly and a method of removing smoke or fumes.

In aspects of the present invention, a fan assembly comprises a housing and a fan inside the housing. The housing having an air inlet and an air outlet. The fan is covered by the housing, the housing having a first suction aperture and a second suction aperture, the first and second suction apertures in communication with an internal space of the housing, the first and second suction apertures having different suction characteristics. The fan and housing are configured to provide suction from at least one of the first suction aperture and the second suction aperture.

In further aspects, the housing comprises a casing and an air guide. The air inlet and the air outlet formed in the casing, the air inlet being on an inlet side of the casing, the casing cover the fan. The air guide is connected to a peripheral edge of the inlet side. The first suction aperture and the second suction aperture are formed in the air guide. The internal space is disposed in the air guide.

In detailed aspects, the air guide at least partially surrounds the air inlet, the first suction aperture is bounded by a first boundary edge, the second suction aperture is bounded by a second boundary edge. The first boundary edge is configured to stably support the housing on a flat environment surface, wherein when the first boundary edge stably supports the housing on the flat environment surface, the second suction aperture is exposed. The second boundary edge is configured to stably support the housing on the flat environment surface, wherein when the second boundary edge stably supports the housing on the flat environment surface, the first suction aperture is exposed. The second suction aperture has a smaller flow-through area than the first suction aperture.

In other detailed aspects, the air guide projects out from the air inlet of the casing, the air guide has a first wall and a second wall, the first and second walls being on opposite sides of the air inlet, the housing is movable from a first stable orientation on a flat environment surface to a second stable orientation on the flat environment surface. When the housing is in the first stable orientation and the fan is rotated, air is drawn into the air inlet entirely or predominantly through the first suction aperture, the first suction aperture having a first air flow-through area between the first and second walls. When the housing is in the second stable orientation and the fan is rotated, air is drawn into the air inlet entirely or predominantly through the second suction aperture, the second suction aperture having a second air flow-through area between the first and second walls, and the first air flow-through area has a greater area than the second air flow-through area.

In aspects of the present invention, a fan assembly comprises a housing and a fan inside the housing. The housing includes an air inlet and an air guide at least partially surrounding the air inlet. The air guide includes one or more suction apertures that allow air to enter the air inlet, the one or more suction apertures being bounded by a first boundary edge and a second boundary edge. The first boundary edge is configured to stably support the housing on a flat environment surface, wherein when the first boundary edge stably supports the housing on the flat environment surface, the one or more suction apertures has a small flow-through area. The second boundary edge is configured to stably support the housing on the flat environment surface, wherein when the second boundary edge stably supports the housing on the flat environment surface, the one or more suction apertures has a large flow-through area that is larger in size than the small flow-through area.

In aspects of the present invention, a fan assembly comprises a housing and a rotatable fan inside the housing. The housing includes an air inlet and an air guide projecting out from the air inlet. The air guide has a first wall and a second wall, the first and second walls being on opposite sides of the air inlet. The housing is movable from a first stable orientation on a flat environment surface to a second stable orientation on the flat environment surface. When the housing is in the first stable orientation and the fan is rotated, air is drawn into the air inlet entirely or predominantly through a first air flow-through area between the first and second walls. When the housing is in the second stable orientation and the fan is rotated, air is drawn into the air inlet entirely or predominantly through a second air flow-through area between the first and second walls, and the first air flow-through area has a greater area than the second air flow-through area.

In aspects of the present invention, a fan assembly comprises a housing having first air inlet aperture, a second air inlet aperture smaller than the first air inlet aperture, a retainer adjacent the first air inlet aperture, and a retainer adjacent the second air inlet aperture. The assembly further comprises a fan inside the housing, and a removable cover configured to slide in and out of engagement with the retainer adjacent the first air inlet aperture, and further configured to slide in and out of engagement with the retainer adjacent the second air inlet aperture. The first air inlet aperture is substantially sealed by the removable cover when the removable cover is engaged with the retainer adjacent the first air inlet aperture. The second air inlet aperture is substantially sealed by the removable cover when the removable cover is engaged with the retainer adjacent the second air inlet aperture.

In aspects of the present invention, a housing which contains a fan and an electric motor, is carried by an articulated arm mounted on a flat environment surface. The articulated arm has a joint that allows yaw rotation, roll rotation, and linear translation of the housing to a variety of positions above the flat environment surface. The articulated arm is connected to the housing by a hinge device that allows for pitch rotation.

In aspects of the present invention, a fan assembly comprises a housing, a fan inside the housing, and a removable cover. The housing having first air inlet aperture, a second air inlet aperture smaller than the first air inlet aperture, a retainer adjacent the first air inlet aperture, and a retainer adjacent the second air inlet aperture. The removable cover configured to slide in and out of engagement with the retainer adjacent the first air inlet aperture, and further configured to slide in and out of engagement with the retainer adjacent the second air inlet aperture. The first air inlet aperture is substantially sealed by the removable cover when the removable cover is engaged with the retainer adjacent the first air inlet aperture. The second air inlet aperture is substantially sealed by the removable cover when the removable cover is engaged with the retainer adjacent the second air inlet aperture. In further aspects, the retainer adjacent the first inlet aperture includes a pair of slots formed into the housing, the pair of slots configured to slidably engage the removable cover. In detailed aspects the retainer adjacent the second air inlet aperture includes an other pair of slots formed into the housing, the other pair of slots configured to slidably engage the removable cover. In further aspects, the fan assembly further comprises an articulated arm connected to the housing.

In aspects of the present invention, a method of removing smoke or fumes includes placing a fan assembly in an area with smoke or fumes in the air, and adjusting the fan assembly to draw air entirely or predominantly through a first air flow-through area between first and second walls of an air guide of the fan assembly, followed by adjusting the fan assembly to draw air entirely or predominantly through a second air flow-through area between first and second walls of the air guide of the fan assembly. The second air flow-through is different in area than the first air flow-through area.

The features and advantages of the invention will be more readily understood from the following detailed description which should be read in conjunction with the accompanying drawings.

DETAILED DESCRIPTION OF THE INVENTION

Figure 1:
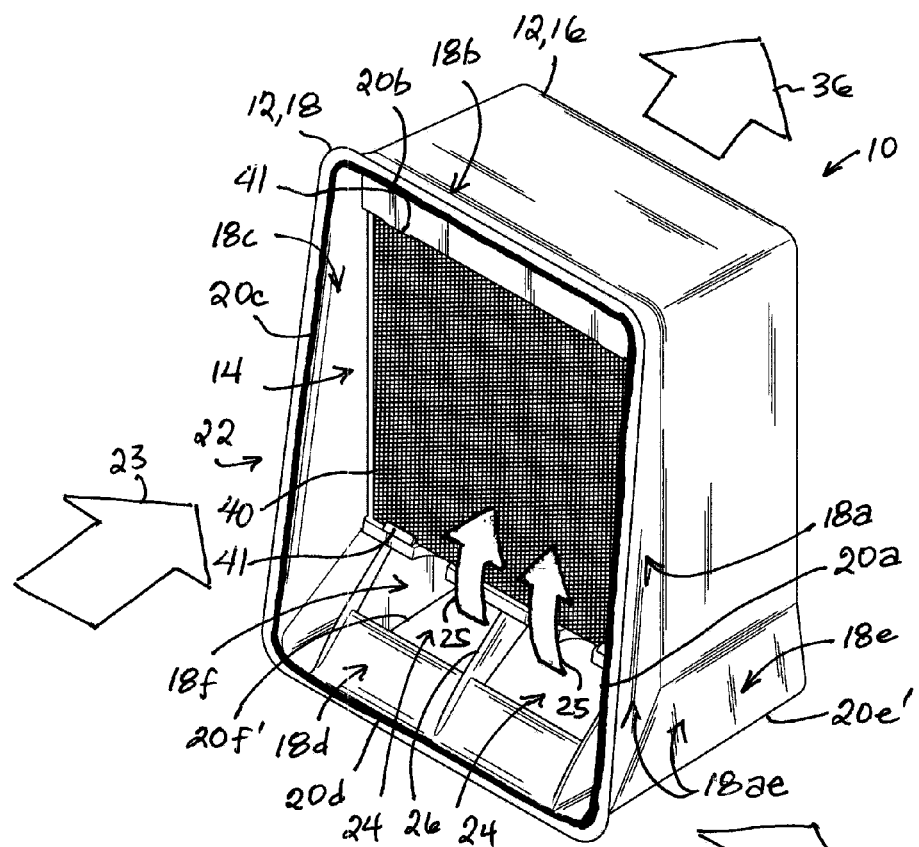
FIGS. 1 and 2 are front and rear perspective views, respectively, of a fan assembly according to a first embodiment of the present invention.

Referring now in more detail to the exemplary drawings for purposes of illustrating embodiments of the invention, wherein like reference numerals designate corresponding or like elements among the several views, there is shown in FIGS. 1-6 a fan assembly 10 according to a first embodiment of the present invention. The fan assembly 10 includes a housing 12 having an air inlet 14. The housing contains a fan on the other side of the air inlet and a motor connected to the fan. The walls of the housing surrounding the fan is referred as a fan casing 16. The air inlet 14 is a hole through the front of the fan casing 16.

The housing 12 includes an air guide 18 configured to guide air to the air inlet 14. The air guide 18 includes a plurality of planar guide walls 18a, 18b, 18c, 18d that are angled relative to each other and sloped outward from the center of the air inlet so that the air guide has the shape of a funnel. The guide walls 18a, 18b, 18c, 18d are connected to the fan casing 16. Three of the guide walls 18a, 18b, 18c are attached directly to the fan casing 16. The other guide wall 18d, referred to as the bottom guide wall, is not directly connected to the fan casing 16 and is carried by two adjacent guide walls 18e, 18f, referred to as side guide walls. The remaining guide wall 18b can be referred to as the top guide wall.

Outer edges 20a, 20b, 20c, 20d of the guide walls 18a, 18b, 18c, 18d form a closed perimeter around a first suction aperture 22 of the air guide 18. The outer edges 20a, 20b, 20c, 20d (collectively referred to as the closed boundary edge of the first suction aperture 22) are illustrated in FIG. 1 with a thicker line for purposes of distinguishing the closed boundary edge from other structural features of the air guide. The first suction aperture 22 can be used to move relatively large volumes of smoke- or fume-laden air at relatively low air flow velocity.

As used herein, the phrase "outer edge" refers to a physical feature at or near either an apex or a perimeter of a surface or other structure. By contrast, the phrase "inner edge" refers to a physical feature at or near the nadir or bottom of a surface or other structure. For example, a sheet of material that is bent at a right angle will have: (1) an inner edge at the bend on one other side of the sheet with surfaces forming a 90-degree angle; (2) an outer edge at the bend on the other side of the sheet with surfaces forming a 270-degree angle; and (3) an outer edge at the perimeter of the sheet.

Figure 2:
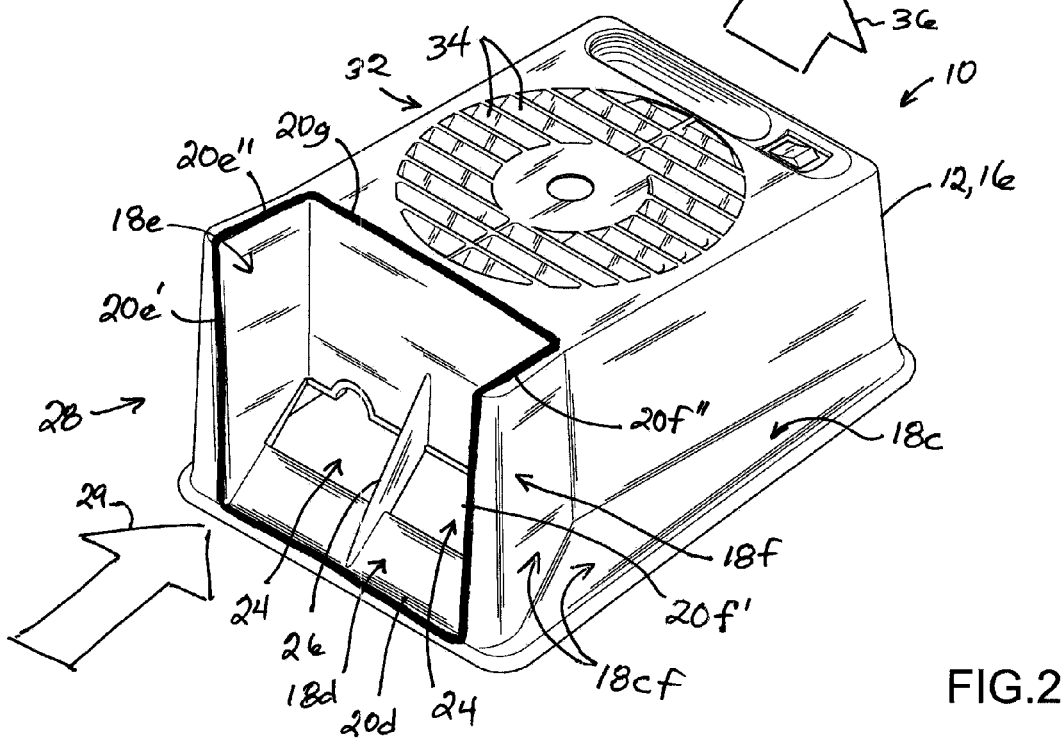
Figure 3:
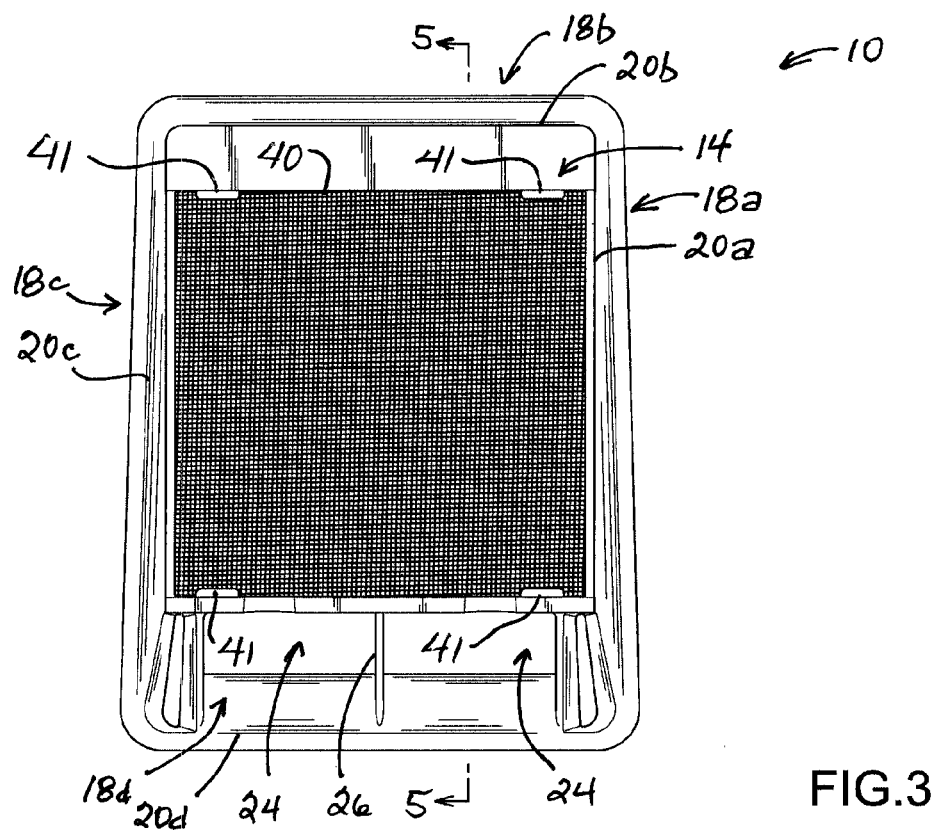
FIGS. 3 and 4 are front and rear views, respectively, of the fan assembly of FIGS. 1 and 2.
Figure 4:
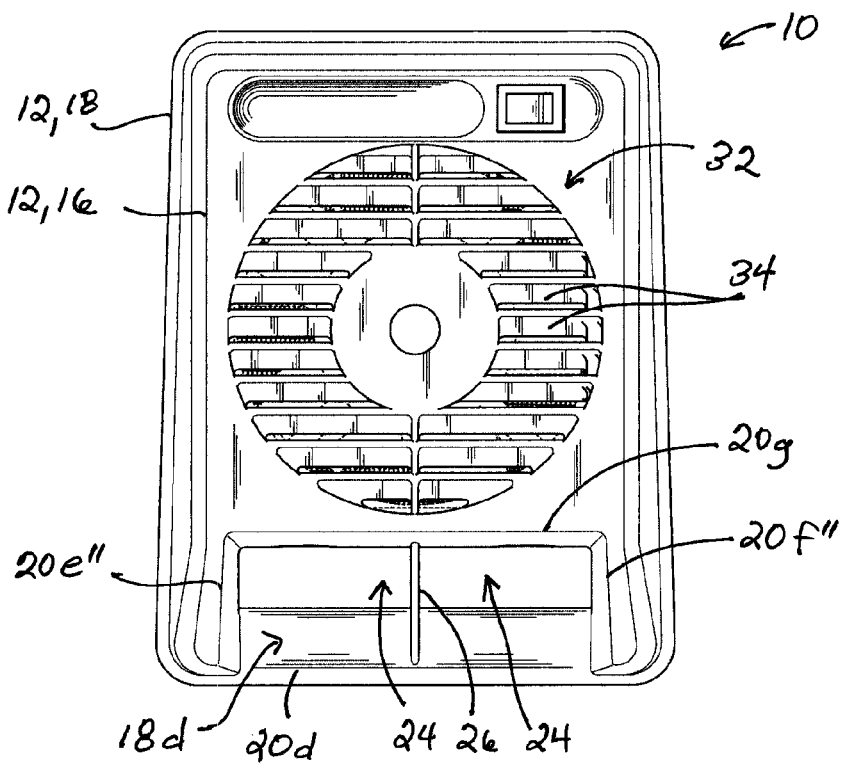

The bottom guide wall 18d of the air guide includes two constriction apertures 24 separated from each other by a slender support member 26 that connects the bottom guide wall to the fan casing 16. The constriction apertures 24 are immediately adjacent the air inlet 14. The constriction apertures 24 lead to a second suction aperture 28 at the bottom and rear of the housing 12, as shown in FIG. 2. The second suction aperture 28 is smaller in area than the first suction aperture 22. The bottom guide wall 18d separates the first and second suction apertures from each other. The constriction apertures 24 in the bottom guide wall 18d constricts the air flow path from the second suction aperture 28 to the air inlet 14. With these features, the second suction aperture 28 can be used to move smoke- or fume-laden air at a relatively high flow velocity, such as may be required to move air located at greater distances from the fan assembly 10.

Referring to FIG. 2, the air guide 18 includes additional guide walls 18e, 18f which meet and connect with the side guide walls 18a, 18c and the bottom guide wall 18d. The additional guide walls 18e, 18f can be referred to as legs. The second suction aperture 28 is bounded in part by outer edges 20d, 20e, 20f of the bottom guide walls and legs 18d, 18e, 18f. An outer edge 20g, which is located at a corner of the fan casing 16, connects or bridges together the outer edges 20e, 20f of the legs 18e, 18f. Thus, it can be seen that the outer edges 20d, 20e, 20f, 20g form a closed perimeter around the second suction aperture 28 of the air guide 18. These outer edges (collectively referred to as the closed boundary edge of the second suction aperture 28) are illustrated in FIG. 2 with a thicker line for purposes of distinguishing the closed boundary edge from other structural features of the housing 12.

Figure 5:
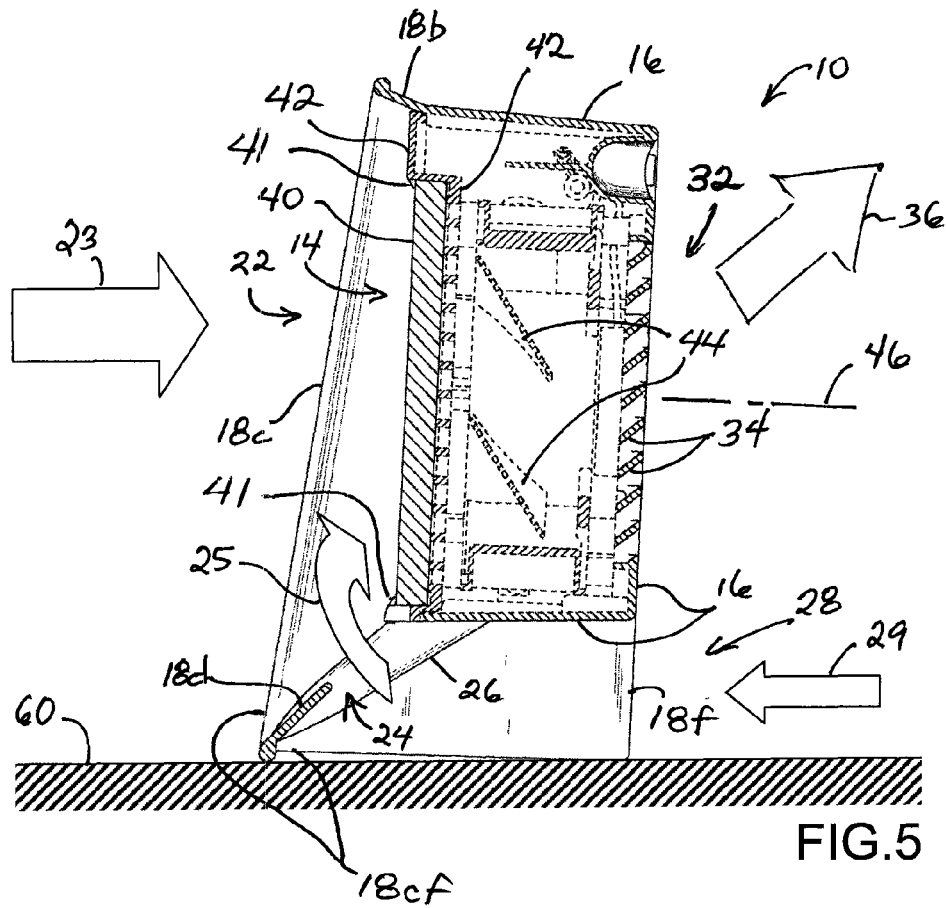
FIGS. 5 and 6 are side cross-sectional views of the fan assembly of FIGS. 1-4 taken along line 5-5 of FIG. 3, showing the fan assembly oriented in first and second suction modes.

In a first mode of operation, the fan assembly 10 rests on its legs 18e, 18f and bottom guide wall 18d, and is oriented in an upright orientation as shown in FIGS. 1 and 5. In the upright orientation, air that is drawn into the air inlet 14 passes predominantly through the first suction aperture 22. That is, the majority of air drawn into the air inlet 14 comes from the first suction aperture 22, although a small amount of air drawn into the air inlet 14 passes through the constriction apertures 24 and the second suction aperture 28.

In the upright orientation (FIGS. 1 and 5), air inflow is generally indicated by arrows 23, 25, 29, and air outflow is generally indicated by arrow 36. The first suction aperture 22 is fully exposed to allow air to be suctioned through it, and the second suction aperture 28 is only partially exposed to allow a lesser amount of air to be suctioned through it. Each of the outer edges 20e, 20f of the legs 18e, 18f includes two straight segments: a long segment 20e', 20f', and a short segment 20e", 20f" that is less than 40% in length of the long segment. The long segments are oriented about ninety degrees from the short segments. Referring to FIGS. 1 and 5, with the fan assembly 10 in the upright orientation, the outer edges 20d, 20e', 20f' of the bottom and side guide walls 18d, 18e, 18f have the following characteristics: (1) they rest above a flat environment surface 60, such as a top surface of a bench or table; (2) they stably support the fan assembly 10 so that the fan assembly remains stable in the upright orientation without external support or securement to the flat environment surface 60; and (3) they contact and/or are in close proximity to the flat environment surface.

The second suction aperture 28 is only partially obstructed when the assembly 10 is in the upright orientation. In FIG. 5, about 60% of the second suction aperture (corresponding to the area between the long segments 20e', 20f' of the leg outer edges) is obstructed. In other embodiments, the percentage is lower or higher.

From FIG. 2 it can be seen that the outer edges 20d, 20e, 20f, 20g (which form a closed perimeter around the second suction aperture 28) are not coplanar. That is, the outer edges 20d, 20e, 20f, 20g do not lie on a single plane (first plane), which prevents the second suction aperture 28 from being substantially sealed by the flat environment surface. In particular, the outer edges 20e", 20f", 20g lie on a different plane (second plane) from that of the remaining outer edges 20d, 20e', 20f'. Thus, in the upright orientation (FIGS. 1 and 5), the short segments 20e", 20f" of the outer edges 20e, 20f and 20g do not form a seal against the flat environment surface 60.

As used herein, "substantial" or "substantially" refers to a condition that when modified by the word "substantially" is understood to not be necessarily absolute or perfect but would be considered close enough to those of ordinary skill in the art to warrant designating the condition as being present. A suction aperture is substantially sealed even if the seal is not air tight, on condition that the flow-through area of the aperture is reduced by at least 75% in some embodiments, preferably at least 85% in other embodiments, and more preferably at least 95% in further embodiments.

Figure 6:
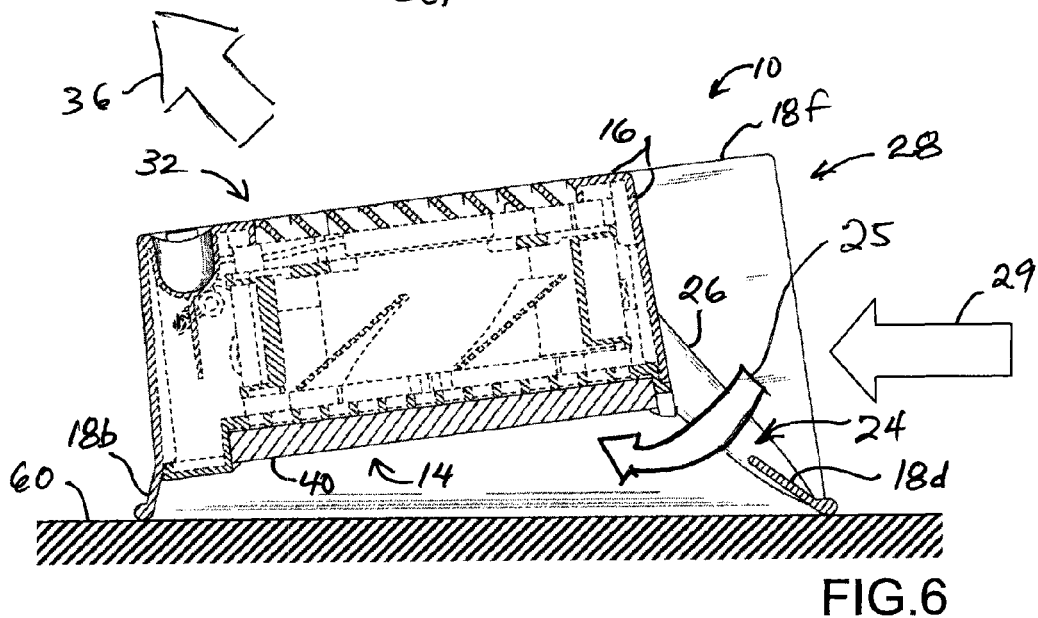

In a second mode of operation, the fan assembly 10 is oriented in a face-down orientation as shown in FIGS. 2 and 6. Adjustment of the fan assembly 10 to and from the first and second modes of operation can be accomplished by tilting the fan assembly on the outer edge 20d of the bottom guide wall 18d. In the face-down orientation, air that is drawn into the air inlet 14 passes predominantly through the second suction aperture 28. In the illustrated embodiment, substantially all the air drawn into the air inlet 14 comes from the second suction aperture 28.

In the face-down orientation (FIGS. 2 and 6), air inflow is generally indicated by arrows 25, 29, and air outflow is generally indicated by arrow 36. The closed boundary edge (collectively 20a, 20b, 20c, 20d) of the first suction aperture 22 have the following characteristics: (1) they rest above a flat environment surface 60, such as a top surface of a bench or table; (2) they stably support the fan assembly 10 so that the fan assembly remains stable in the face-down orientation without external support or securement to the flat environment surface; and (3) they contact and/or are in close proximity to the flat environment surface so that the first suction aperture 22 is substantially sealed by the flat environment surface.

FIGS. 1 and 6 show that the closed boundary edge (collectively 20a, 20b, 20c, 20d) of the first suction aperture 22 is substantially planar. That is, the outer edges 20a, 20b, 20c, 20d lie on a single plane, which enables the first suction aperture 22 to be substantially sealed by the flat environment surface 60. Even with slight deviations in elevation in the outer edges 20a, 20b, 20c, 20d (such as may occur with inherent manufacturing variations or with small bumpers added on the air guide edges), the closed boundary edge will still be in contact and/or close proximity to the flat environment surface 60 to form a substantial seal.

As used herein, the word "planar" encompasses perfectly planar and substantially planar, unless stated otherwise, and the "coplanar" encompasses perfectly coplanar and substantially coplanar, unless stated otherwise. As previously explained, a condition that when modified by the word "substantially" is understood to not be necessarily absolute or perfect but would be considered close enough to those of ordinary skill in the art to warrant designating the condition as being present.

In the upright orientation (FIGS. 1 and 5), air inflow toward the first suction aperture 22 is generally indicated by arrow 23, and air inflow from the constriction apertures 24 to the air inlet 14 is generally indicated by arrow 25. The air inlet 14 is substantially perpendicular to the flat environment surface 60. In the face-down orientation of FIG. 2, air inflow toward the second suction aperture 28 is generally indicated by arrow 29, and air inflow from the constriction apertures 24 to the air inlet 14 is generally indicated by arrow 25. The air inlet 14 is at an acute angle, from about five to fifteen degrees, to the flat environment surface 60. At the rear of the fan casing 16 there is a hole, referred to as the air outlet 32 which is covered in part by a plurality of vanes 34 that direct air outflow generally along arrow 36. Whether the fan assembly 10 is in the upright or face-down orientation, the air outflow direction 36 is always upward and always generally opposite from the predominant air inflow directions 23, 29.

As shown in the cross-sectional view of FIG. 5, there is a removable air filter 40 at the air inlet 14. The air filter is a porous plastic foam with an activated carbon coating. The air filter 40 is held in place by tabs 41 that protrude from a front plate 42. The front plate 42, which has a plurality of air flow apertures, fits into the air inlet 14 and covers the front of the fan 44. The vanes 34 cover the rear of the fan 44. The vanes 34 are fixed at an oblique angle, optionally from about thirty to sixty degrees, relative to the rotational axis 46 of the fan 44.

The term "oblique angle" refers to a direction that is not perpendicular and not parallel to a referenced structure.

As shown in FIG. 1, the right side guide wall 18a merges with the right leg 18e to form an L-shaped first wall labeled 18ae. As shown in FIG. 2, the left side guide wall 18c merges with the left leg 18f to form an L-shaped second wall labeled 18cf. The first and second suction apertures 22, 28 are disposed between the first wall 18ae and the second wall 18cf.

In some embodiments, the air inlet 14 encompasses an area W, the first suction aperture 22 has an air flow-through area X, the second suction aperture 28 has an air flow-through area Y, and each of the constriction apertures 24 has an air flow-through area Z, wherein X>W>Y>Z. In some embodiments, the air inlet 14 encompasses an area of about 169 square centimeters, the first suction aperture 22 has an air flow-through area of about 290 square centimeters, the second suction aperture 28 has an air flow-through area of about 129 square centimeters, and each of the constriction apertures 24 has an air flow-through area of about 33 square centimeters. Applicant has found that these flow-through areas work particularly well for a broad range of soldering task situations.

In other embodiments, the housing 12 contains no fan and no motor, and the rear air outlet 32 of the housing can be connected to an air suction hose.

FIGS. 7-10 show a fan assembly 100 according to a second embodiment of the present invention. Except for the geometric configuration of the second suction aperture, the fan assembly 100 is structurally the same as the fan assembly 10 of FIGS. 1-6. Structural similarities between the first and second embodiments include the fan casing 116, vanes 134, air filter 140, front plate 142, and internal components such as the fan 144. A main difference between the first and second embodiments is that the second suction aperture 128 of the fan assembly 100 has boundary edges that are coplanar, which allows a second suction aperture 128 to be substantially sealed by a flat environment surface 160 when the fan assembly 100 is in the upright orientation (first mode of operation).

Figure 7:
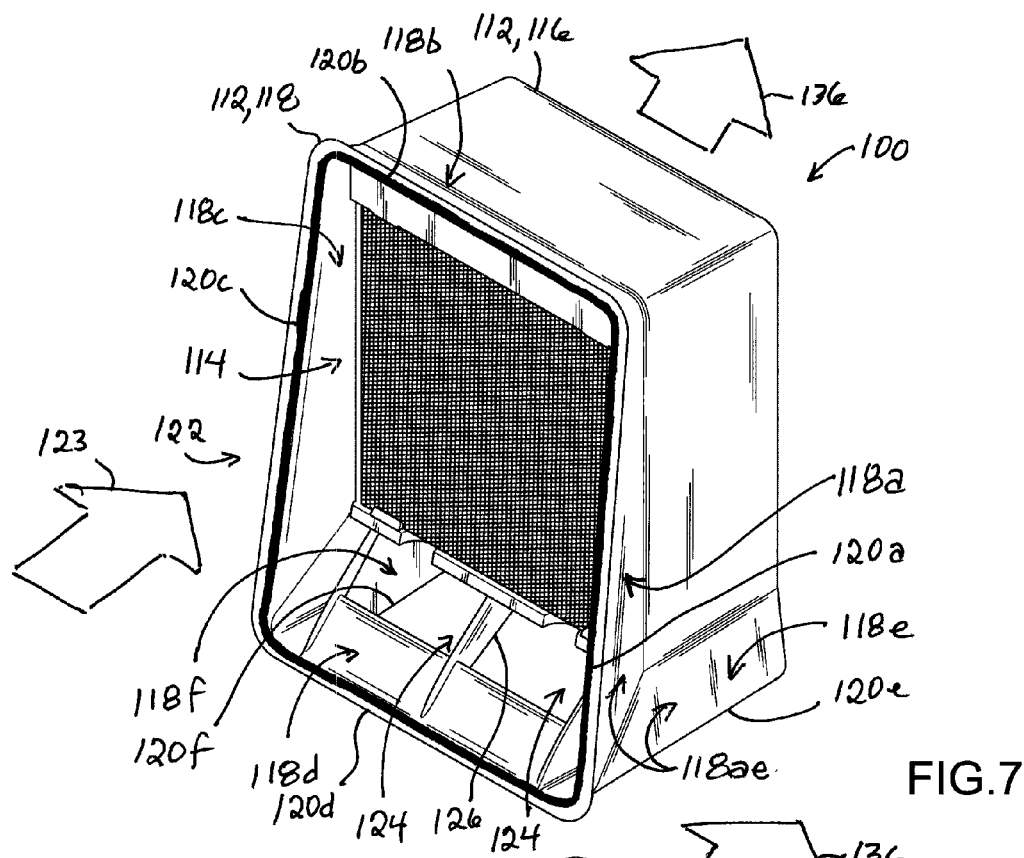
FIGS. 7 and 8 are front and rear perspective views, respectively, of a fan assembly according to a second embodiment of the present invention.

Outer edges 120a, 120b, 120c, 120d of the guide walls 118a, 118b, 118c, 118d form a closed perimeter around the first suction aperture 122 of the air guide 118. The outer edges 120a, 120b, 120c, 120d (collectively referred to as the closed boundary edge of the first suction aperture 122) are illustrated in FIG. 7 with a thicker line for purposes of distinguishing the closed boundary edge from other structural features of the housing 112. The first suction aperture 122 can be used to move relatively large volumes of smoke- or fume-laden air at relatively low air flow velocity.

The bottom guide wall 118d of the air guide includes two constriction apertures 124 separated from each other by a slender support member 126 that connects the bottom guide wall to the fan casing 116. The constriction apertures 124 lead to the second suction aperture 128 shown in FIG. 8. The second suction aperture 128 is smaller in area than the first suction aperture 122. The bottom guide wall 118d separates the first and second suction apertures from each other. The constriction apertures 124 in the bottom guide wall 118d constricts the air flow path from the second suction aperture 128 to the air inlet 114. With these features, the second suction aperture 128 can be used to move smoke- or fume-laden air at a relatively high flow velocity, such as may be required to move air located at greater distances from the fan assembly 100.

Figure 8:
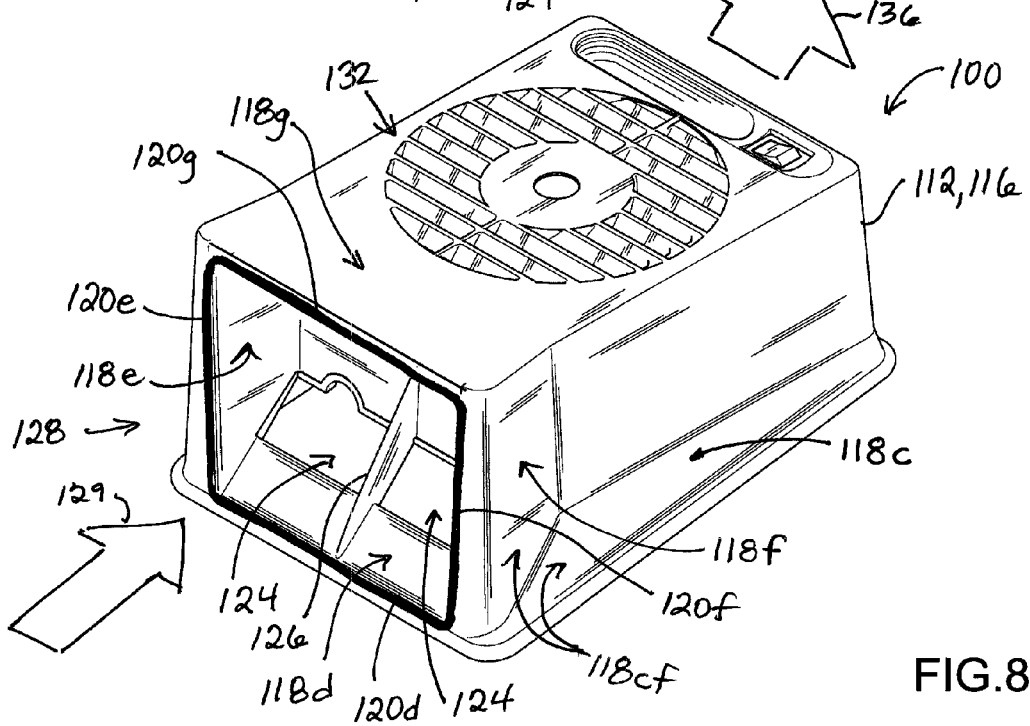
Figure 9:
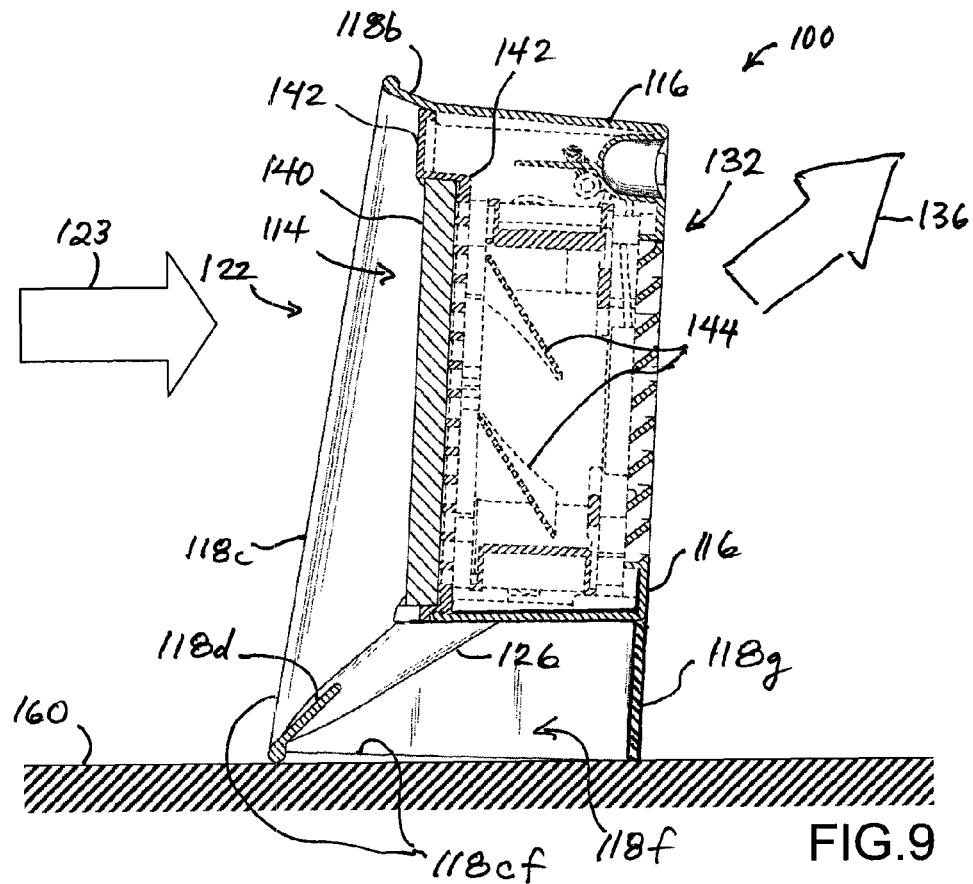
FIGS. 9 and 10 are side cross-sectional views of the fan assembly of FIGS. 7 and 8, showing the fan assembly oriented in first and second suction modes.

Referring to FIG. 8, the air guide 118 includes additional guide walls (referred to as legs) 118e, 118f which meet and connect with the side guide walls 118a, 118c and the bottom guide wall 118d. Unlike the first embodiment, the air guide 118 of the second embodiment includes a rear guide wall 118g. The rear guide wall 118g is an integral part of the air guide 118 and is permanently connected to the fan casing 116. In other embodiments, rear guide wall 118g can be removable from the fan casing 116 and the remainder of the air guide 118.

The rear guide wall 118g connects to the fan casing 116 and the legs 118e, 118f. An outer edge 120g of the rear guide wall 118g connects or bridges together the outer edges 120e, 120f of the legs 118e, 118f. Thus, it can be seen that the outer edges 120d, 120e, 120f, 120g form a closed perimeter around the second suction aperture 128 of the air guide 118. These outer edges (collectively referred to as the closed boundary edge of the second suction aperture 128) are illustrated in FIG. 8 with a thicker line for purposes of distinguishing the closed boundary edge from other structural features of the housing 112. The closed boundary edge of the second suction aperture 128 is substantially planar, unlike the first embodiment. That is, the outer edges 120d, 120e, 120f, 120g lie on a single plane, which enables the second suction aperture 128 to be substantially sealed by the flat environment surface 160. Even with slight deviations in elevation in the outer edges 120d, 120e, 120f, 120g (such as might occur with inherent manufacturing variations or with small anti-slip bumpers added to the air guide) the closed boundary edge of the second suction aperture 128 will be in contact and/or close proximity to the flat environment surface 160 to form a substantial seal.

In the upright orientation (FIGS. 7 and 9), air inflow toward the first suction aperture 122 is generally indicated by arrow 123, and air outflow from the outlet 132 is generally indicated by arrow 136. The fan assembly 110 rests on its legs 118e, 118f, rear guide wall 118g and bottom guide wall 118d. Air that is drawn into the air inlet 114 passes predominantly through the first suction aperture 122. Substantially all the air drawn into the air inlet 114 comes from the first suction aperture 122. The second suction aperture 128 is substantially sealed by the flat environment surface. With the fan assembly 100 in the upright orientation, the closed boundary edges 120d, 120e, 120f, 120g of the second suction aperture 128 have the following characteristics: (1) they rest above a flat environment surface 160, such as a top surface of a bench or table; (2) they stably support the fan assembly 110 so that the fan assembly remains stable in the upright orientation without external support or securement to the flat environment surface; and (3) they contact and/or are in close proximity to the flat environment surface 60 so that the second suction aperture 128 is substantially sealed by the flat environment surface.

Figure 10:
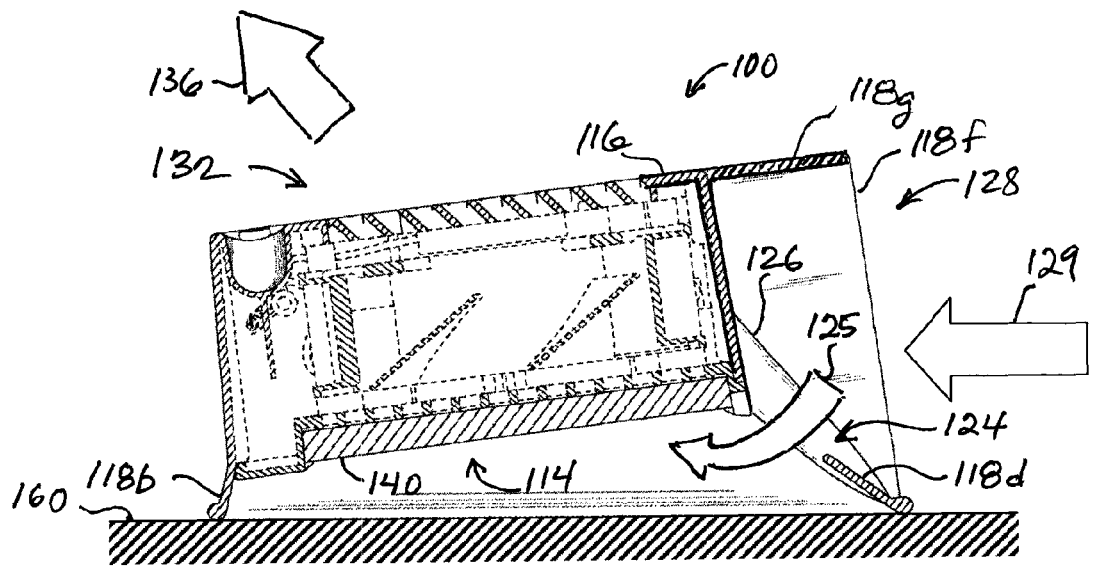

As shown in FIGS. 8 and 10, when the fan assembly 100 is in the face-down orientation (second mode of operation), air inflow toward the second suction aperture 128 is generally indicated by arrow 129, air inflow from the constriction apertures 124 to the air inlet 114 is generally indicated by arrow 125, and air outflow from the outlet 132 is generally indicated by arrow 136. Air that is drawn into the air inlet 114 passes predominantly through the second suction aperture 128. Substantially all the air drawn into the air inlet 114 comes from the second suction aperture 128. The closed boundary edge (collectively 20a, 20b, 20c, 20d) of the first suction aperture 122 have the following characteristics: (1) they rest above a flat environment surface 160, such as a top surface of a bench or table; (2) they stably support the fan assembly 110 so that the fan assembly remains stable in the face-down orientation without external support or securement to the flat environment surface; and (3) they contact and/or are in close proximity to the flat environment surface so that the first suction aperture 122 is substantially sealed by the flat environment surface.

FIGS. 8 and 10 show that the closed boundary edge (collectively 120a, 120b, 120c, 120d) of the first suction aperture 122 is substantially planar. That is, the outer edges 120a, 120b, 120c, 120d lie on a single plane, which enables the first suction aperture 122 to be substantially sealed by the flat environment surface 160. Even with slight deviations in elevation in the outer edges 120a, 120b, 120c, 120d (such as might occur with inherent manufacturing variations or with small anti-slip bumpers added to the air guide) the closed boundary edge will be in contact and/or close proximity to the flat environment surface 160 to form a substantial seal.

As shown in FIG. 7, the right side guide wall 118a merges with the right leg 118e to form an L-shaped first wall denoted as 118ae. As shown in FIG. 8, the left side guide wall 118c merges with the left leg 118f to form an L-shaped second wall denoted as 118cf. The first wall 18ae forms the entire right side of the air guide. The second wall 118cf forms the entire left side of the air guide. The first and second suction apertures 122, 128 are disposed between the first wall 118ae and the second wall 118cf.

In other embodiments, the housing 112 contains no fan and no motor, and the rear air outlet 132 of the housing is configured for connection to an air suction hose.

Figure 11:
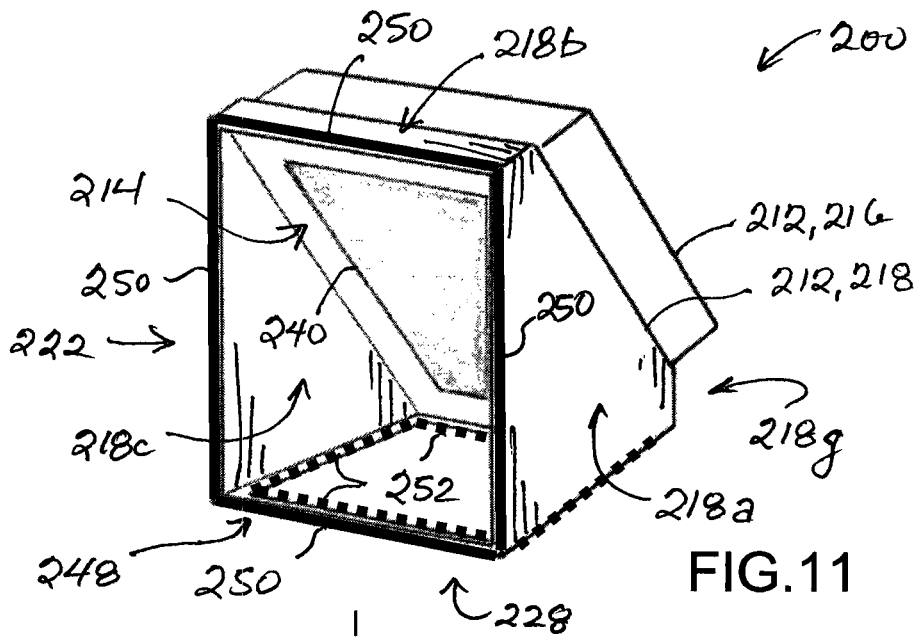
FIG. 11 is a perspective view of a fan assembly according to a third embodiment of the present invention.
Figure 12:
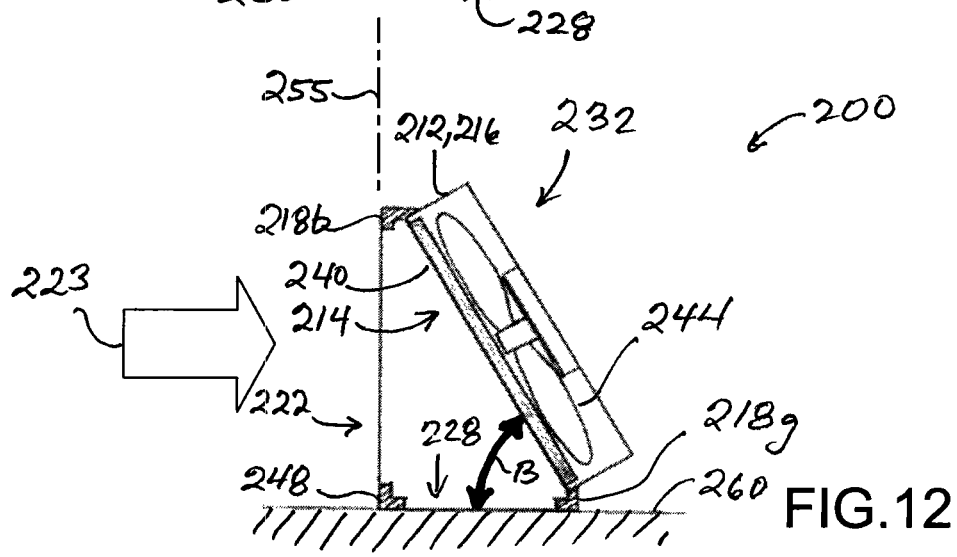
FIGS. 12 and 13 are side cross-sectional views of the fan assembly of FIG. 11, showing the fan assembly oriented in first and second suction modes.
Figure 13:
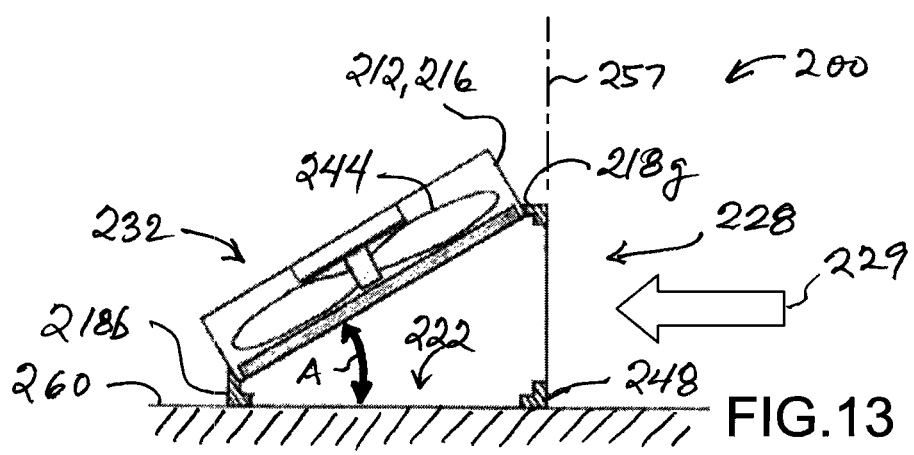

FIGS. 11-13 show a fan assembly 200 according to a third embodiment of the present invention. A housing 212 includes a fan casing 216 and an air guide 218. A motorized fan 244 is contained within the fan casing 216. At one end of the fan casing there is a rectangular air inlet 214 and at the opposite end there is an air outlet 232. An optional air filter 240, made of activated carbon coated plastic foam, is removably attached to the air inlet 214. The air guide include two side guide walls 218a, 218c on opposite sides of the rectangular air inlet 214. The side guide walls each have a top end, a bottom end, front end, and rear end. The top end is narrower than the bottom end. A top guide wall 218b connects the top ends of the side guide walls together. A rear guide wall 218g connects the rear ends of the side guide walls 218a, 218c together. A bar 248 connects the bottom-front corners of the side guide walls 218a, 218c together.

The air guide 218 has a rectangular first suction aperture 222 and a rectangular second suction aperture 228 smaller in area than the first suction aperture. The first and second suction apertures are disposed between the side guide walls 218a, 218c.

As shown in FIG. 13, when oriented in a face-down mode of operation, the fan assembly 200 is stably supported by the front ends of the side guide walls 218a, 218c. The air inlet 214 is at a non-zero oblique angle A to the flat environment surface 260. The first suction aperture 222 has a closed boundary edge 250 that is planar to allow it to be substantially sealed by a flat environment surface 260 when the assembly 200 is in the face-down mode (FIG. 13). In this way, air drawn into the air inlet 214 passes exclusively through the second suction aperture 228 as shown by air flow arrow 229. The closed boundary edge 250 is formed by the outer edges of the top guide wall 218b, the bar 248, and the front ends of the side guide walls 218a, 218c. The closed boundary edge 250 is illustrated in FIG. 11 with a thick solid line to distinguish it from other structural features of the housing 212. The closed boundary edge 250 forms a first plane 255 (FIG. 12) and is configured to lie on the flat environment surface 260. Even with slight deviations in elevation in the closed boundary edge 250 of the first suction aperture 222 (such as may occur with inherent manufacturing variations or with small bumpers added on the air guide edges) the closed boundary edge 250 will be in contact and/or close proximity to the flat environment surface 260 to form a substantial seal.

As shown in FIG. 12, when oriented in an upright mode of operation, the fan assembly 200 is stably supported by bottom ends of the side guide walls 218a, 218c and the bar 248. The air inlet 214 is at a non-zero oblique angle B to the flat environment surface 260. Oblique angle B is greater than oblique angle A. The second suction aperture 228 has a closed boundary edge 252 that is planar to allow it to be substantially sealed by the flat environment surface 260 when the assembly 200 is in the upright mode (FIG. 12). In this way, air drawn into the air inlet 214 passes exclusively through the first suction aperture 222 as shown by air flow arrow 223. The closed boundary edge 252 is formed by outer edges of the rear guide wall 218g, the bar 248, and the bottom ends of the side guide walls 218a, 218c. The closed boundary edge 252 is illustrated in FIG. 11 with a thick broken line to distinguish it from other structural features of the housing 212. The closed boundary edge 252 forms a second plane 257 (FIG. 13) that is substantially perpendicular to the closed boundary edge 250 forming the first plane 255 (FIG. 12).

In the upright mode of operation (FIG. 12) the second suction aperture 228 is substantially sealed by the flat environment surface 260. Even with slight deviations in elevation in the closed boundary edge 252 of the second suction aperture 228 (such as may occur with inherent manufacturing variations or with small bumpers added on the air guide edges) the closed boundary edge 252 will be in contact and/or close proximity to the flat environment surface 260 to form a substantial seal.

Figure 14:
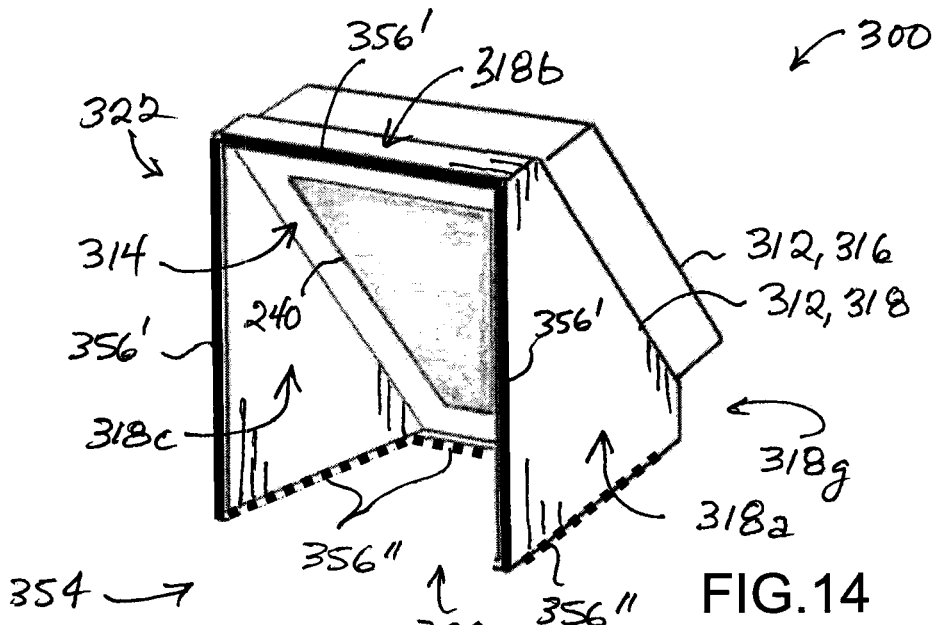
FIG. 14 is a perspective view of a fan assembly according to a fourth embodiment of the present invention.
Figure 15:
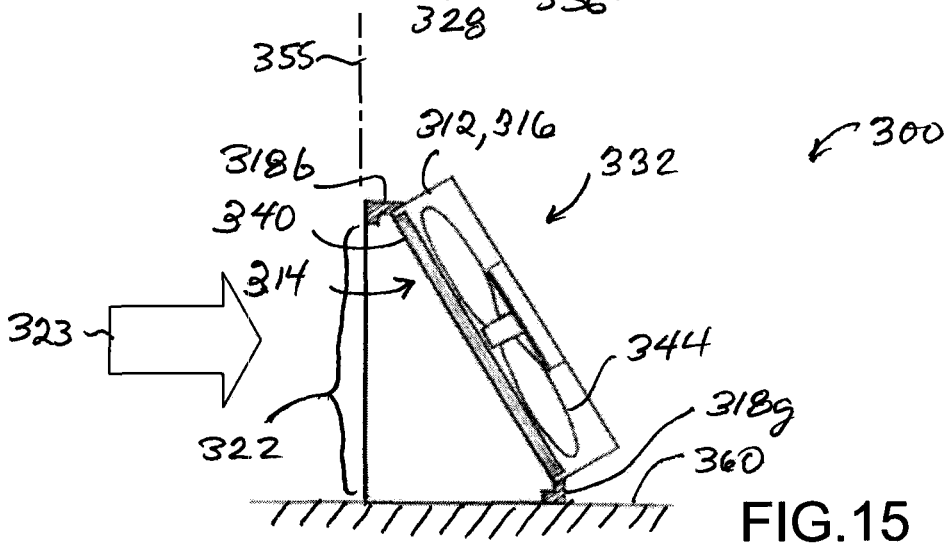
FIGS. 15 and 16 are side cross-sectional views of the fan assembly of FIG. 14, showing the fan assembly oriented in first and second suction modes.
Figure 16:
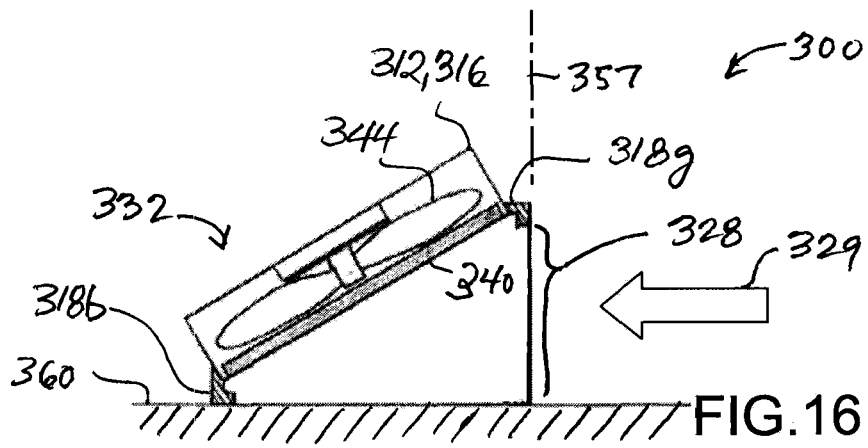

FIGS. 14-16 show a fan assembly 300 according to a fourth embodiment of the present invention. The fan assembly 300 is structurally the same as the fan assembly 200 of FIGS. 11-13 except that the fan assembly 300 does not have a bar connecting the bottom-front corners of the side guide walls. A housing 312 includes a fan casing 316 and an air guide 318. An electric fan 344 is contained within the fan casing 316. At one end of the fan casing there is a rectangular air inlet 314 and at the opposite end there is an air outlet 332. An optional air filter 340, made of activated carbon coated plastic foam, is removably attached to the air inlet 314. The air guide includes side guide walls 318a, 318c on opposite sides of the rectangular air inlet 314. The side guide walls 318a, 318c each have a top end, a bottom end, front end, and rear end. The top end is narrower than the bottom end. A top guide wall 318*b* connects the top ends of the side guide walls 318*a*, 318*c* together. A rear guide wall 318*g* connects the rear ends of the side guide walls 318*a*, 318*c* together.

The air guide 318 has only one suction aperture 354, which is disposed between the two side guide walls 318*a*, 318*c*. The suction aperture 354 has a closed boundary edge 356 that is not planar. The closed boundary edge 356 is formed by the outer edges of the top guide wall 318*b*, the rear guide wall 318*g*, the front ends of the side guide walls 318*a*, 318*c*, and the bottom ends of the side guide walls 318*a*, 318*c*. A first part of the closed boundary edge 356 lies on a first plane 355 (FIG. 15) and a second part of the closed boundary edge 356 lies on a second plane 357 (FIG. 16). The first and second planes are substantially perpendicular to each other. The first part 356' of the closed boundary edge comprises the coplanar outer edges of the top guide wall 318*b* and front ends of the side guide walls 318*a*, 318*c*. The first part 356' of the closed boundary edge is illustrated in FIG. 14 with a thick solid line to distinguish it from other structural features. The second part 356" of the closed boundary edge comprises the coplanar outer edges of the rear guide wall 318*g* and the bottom ends of the side guide walls 318*a*, 318*c*. The second part 356" of the closed boundary edge is illustrated in FIG. 14 with a thick broken line to distinguish it from other structural features.

As shown in FIG. 16, when oriented in a face-down mode of operation, the fan assembly 300 is stably supported by the first part 356' of the closed boundary edge (thick solid line of FIG. 14). The suction aperture 354 is partially obstructed by a flat environment surface 360 when the fan assembly 300 is in the face-down mode. The first part 356' of the closed boundary edge is in contact with and covered by the flat environment surface 360, so that the air drawn into the air inlet 314 passes exclusively through the second part 356" of the closed boundary edge (thick broken line of FIG. 14) as shown by air flow arrow 329 (FIG. 16). The air flows in through a planar area that is on the second plane 357 and is bounded by the flat environment surface 360 and the second part 356" of the closed boundary edge. This area is referred to as the small flow-through area 328.

As shown in FIG. 15, when oriented in an upright mode of operation, the fan assembly 300 is stably supported by the second part 356" of the closed boundary edge (thick broken line of FIG. 14). The suction aperture 354 is partially obstructed by the flat environment surface 360 when the fan assembly 300 is in the upright mode. The second part 356" of the closed boundary edge is in contact with and covered by the flat environment surface 360, so that the air drawn into the air inlet 314 passes exclusively through the first part 356' of the closed boundary edge (thick solid line of FIG. 14) as shown by air flow arrow 323 (FIG. 15). The air flows through a planar area that is on the first plane 355 and is bounded by the flat environment surface 360 and the first part 356' of the closed boundary edge. This area is referred to as the large flow-through area 322, which is greater in area than the small flow-through area 328. The small and large flow-through areas are separate and distinct in the sense that they do not overlap each other. Optionally, the suction aperture 354 encompasses an area of about 419 square centimeters, the large flow-through area 322 is about 290 square centimeters, and the small flow-through area 328 is about 129 square centimeters.

The small and large flow-through areas 322, 328 merge together and collectively form the suction aperture 354. The suction apertures of the first through third embodiments are separate and distinct from each other and do not merge together to form a single aperture.

In the upright mode of operation (FIG. 15) the small flow-through area 328 is substantially sealed by the flat environment surface 360. Even with slight deviations in elevation in the second part 356" of the closed boundary edge (such as may occur with inherent manufacturing variations or with small bumpers added on the air guide edges) the second part 356" will be in contact and/or close proximity to the flat environment surface 360 to form a substantial seal.

In the face-down mode of operation (FIG. 16) the large flow-through area 322 is substantially sealed by the flat environment surface 360. Even with slight deviations in elevation in the first part 356' of the closed boundary edge (such as may occur with inherent manufacturing variations or with small bumpers added on the air guide edges) the first part 356' will be in contact and/or close proximity to the flat environment surface 360 to form a substantial seal.

Figure 17:
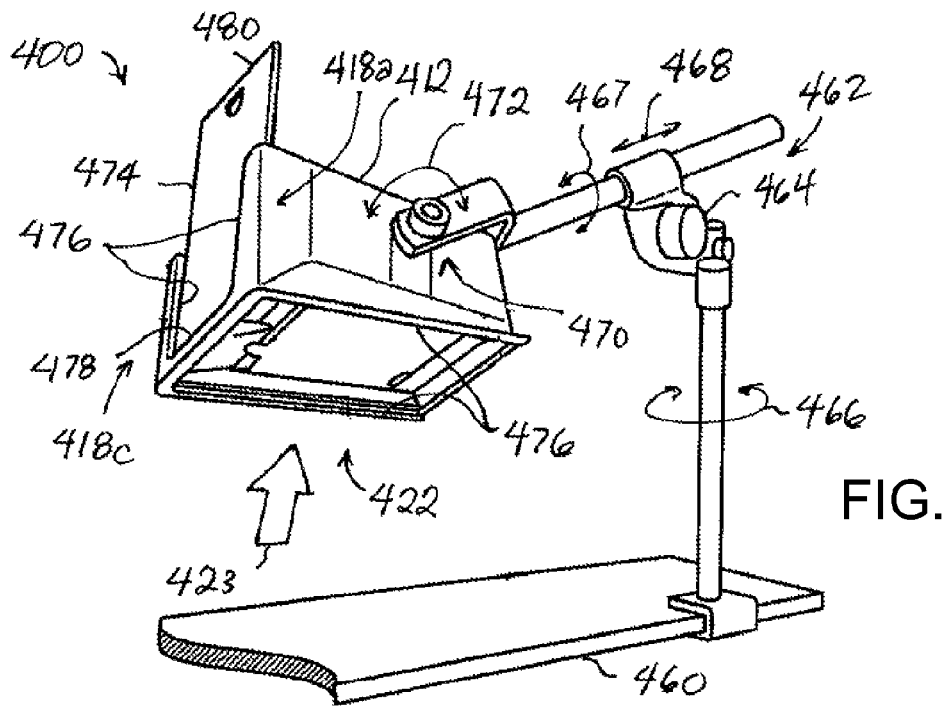
FIGS. 17 and 18 are perspective views of a fan assembly according to a fifth embodiment of the present invention, showing the fan assembly in first and second suction modes.
Figure 18:
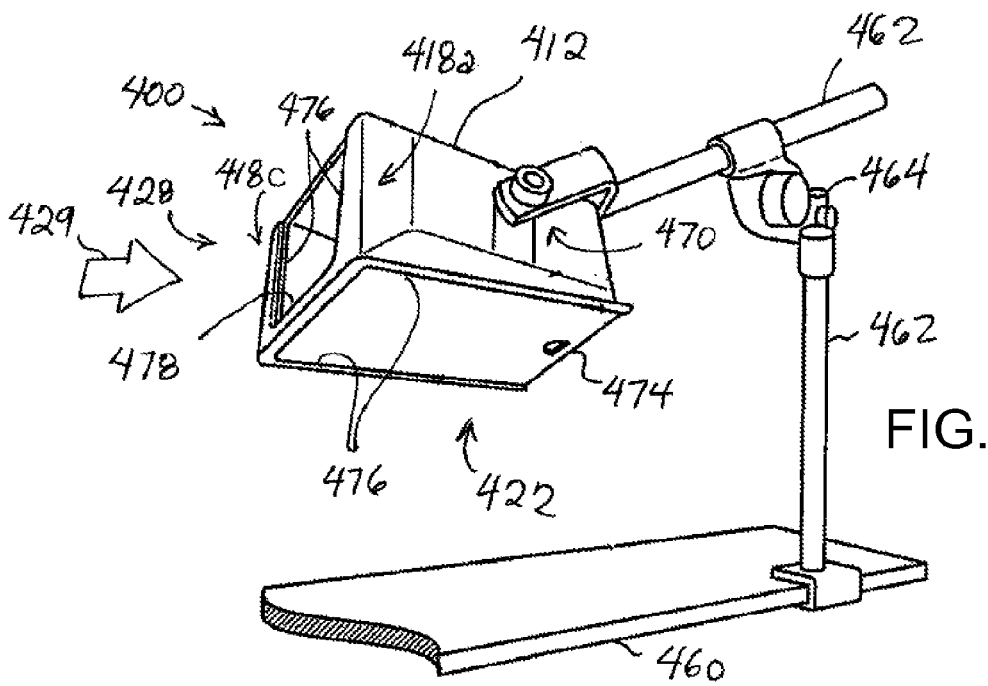

FIGS. 17 and 18 show a fan assembly 400 according to a fifth embodiment of the present invention. A housing 412, which contains a fan and an electric motor, is carried by an articulated arm 462 mounted on a flat environment surface 460. The articulated arm has a joint 464 that allows yaw rotation 466, roll rotation 467, and linear translation 468 of the housing 412 to a variety of positions above the flat environment surface 460. The articulated arm 462 is connected to the housing 412 by a hinge device 470 that allows for pitch rotation 472.

The housing 412 comprises a large suction aperture 422 and a small suction aperture 428 that is shorter in length than the large suction aperture. The large and small suction apertures are the same in width. A rectangular sliding door 474 is removably attached to the housing 412 and can be used to selectively cover either the large suction aperture or the small suction aperture. The sliding door 474 is sized and shaped to have substantially the same size and shape as the large suction aperture 422 at the bottom of the housing 412.

In a first mode of operation, as shown in FIG. 17, the sliding door 474 substantially seals the small suction aperture 428 so that air is drawn predominantly through the large suction aperture 422 as indicated by air inflow arrow 423. The sliding door 474 slidably engages grooves or slots 476 at the front of the housing 412. The slots 476 are located at top side guide walls 418*a*, 418*c* of the housing. A forward end of the sliding door 474 is stopped by a bar 478 that connects the front-bottom corners of the side guide walls together. A rear end 480 of the sliding door 474 protrudes out from the housing 412 since the small suction aperture 428 is shorter in length than the sliding door.

In a second mode of operation, as shown in FIG. 18, the sliding door 474 substantially seals the large suction aperture 422 so that air is drawn predominantly through the small suction aperture 428 as indicated by air inflow arrow 429. The sliding door 474 slidably engages grooves or slots 476 at the bottom of the housing 412. The slots 476 are located at front side guide walls 418*a*, 418*c* of the housing. The forward end of the sliding door 474 is stopped by the bar 478.

It is contemplated that the sliding door and slots of the fifth embodiment can be implemented in the first, second, third, and fourth embodiments in order to selectively cover the first and second suction apertures.

Further embodiments will now be described. Although the embodiments below are described with reference to FIGS. 1-18, it will be appreciated that structural configurations other than those shown in FIGS. 1-18 can be used.

In further embodiments, a fan assembly comprises a housing 12, 112, 212, 312 and a fan 44, 144, 244, 344 inside the housing. The housing includes an air inlet 14, 114, 214, 314 and an air guide 18, 118, 218, 318 at least partially surrounding the air inlet. The air guide includes one or more suction apertures 22, 28, 122, 128, 222, 228, 354 that allow air to enter the air inlet. The one or more suction apertures is bounded by a first boundary edge 20*a-d*, 120*a-d*, 250, 356' and a second boundary edge 20*d-g*, 120*d-g*, 252, 356".

The first boundary edge 20*a-d*, 120*a-d*, 250, 356' is configured to rest on and stably support the housing on the flat environment surface. When the first boundary edge 20*a-d*, 120*a-d*, 250, 356' rests on the flat environment surface, the one or more suction apertures has a small flow-through area 28, 128, 228, 328. The second boundary edge 20*d-g*, 120*d-g*, 252, 356" is configured to rest on and stably support the housing on the same flat environment surface. When the second boundary edge 20*d-g*, 120*d-g*, 252, 356" rests on the flat environment surface, the one or more suction apertures has a large flow-through area that is substantially different in size the small flow-through area 22, 122, 222, 322 that is substantially different in size the small flow-through area. The large flow-through area is substantially greater in size than the small flow-through area.

Optionally in some embodiments, the first boundary edge 20*a-d*, 120*a-d*, 250 is a closed perimeter of a first suction aperture 22, 122, 222 of the air guide, and the first suction aperture corresponds to the large flow-through area. Optionally in some embodiments, the closed perimeter of the first suction aperture 22, 122, 222 is planar so that the first suction aperture is substantially sealed by the flat environment surface when the first boundary edge 20*a-d*, 120*a-d*, 250 rests on the flat environment surface.

Optionally in some embodiments, the second boundary edge 20*d-g*, 120*d-g*, 252 is a closed perimeter of a second suction aperture 28, 128, 228 in the air guide, and the second suction aperture corresponds to the small flow-through area. Optionally in some embodiments, the closed perimeter of the second suction aperture 128, 228 is planar so that the second suction aperture is substantially sealed by the flat environment surface when the second boundary edge 120*d-g*, 252 rests on the flat environment surface. Alternatively in some embodiments, the closed perimeter of the second suction aperture 28 is non-planar so that the second suction aperture is not substantially sealed by the flat environment surface when the second boundary edge 20*d-g* rests on the flat environment surface.

Optionally in some embodiments, the air inlet is disposed between the fan and the air guide, and the air guide includes a first wall 18*cf*, 118*ae*, 218*a*, 318*a* and a second wall 18*cf*, 118*cf*, 218*c*, 318*c*. The first and second walls each project way from the air inlet and the fan, and the one or more suction apertures 22, 28, 122, 128, 222, 228, 354 are disposed between the first wall and the second wall.

Optionally in some embodiments, the first boundary edge 20*a-d*, 120*a-d*, 250, 356' includes an outer edge of the first wall 18*ae*, 118*ae*, 218*a*, 318*a* and an outer edge of the second wall 18*cf*, 118*cf*, 218*c*, 318*c*. Optionally in some embodiments, the second boundary edge 20*d-g*, 120*d-g*, 252, 356" includes an other outer edge of the first wall 18*ae*, 118*ae*, 218*a*, 318*a* and an other outer edge of the second wall 18*cf*, 118*cf*, 218*c*, 318*c*.

Optionally in some embodiments, the one or more suction apertures includes a first suction aperture 22, 122 in front of the air inlet 14, 114 and a second suction aperture 28, 128 below the air inlet 14, 114. The first and second suction apertures are disposed between the first wall 18*ae*, 118*ae* and the second wall 18*cf*, 118*cf*. The air guide includes a bottom wall 18*d*, 118*d* connecting the first and second walls to each other. The bottom wall 18*d*, 118*d* separates the first and second suction apertures from each other. The bottom wall 18*d* partially obstructs airflow from the second suction opening 28, 128 to the air inlet 14, 114. The bottom wall 18*d* has one or more constriction apertures 24, 124 formed therethrough which allows air from the second suction aperture 28, 128 to be drawn into the air inlet 14, 114 when the fan is rotating. Optionally in some embodiments, the one or more constriction apertures 24, 124 collectively provide an air flow-through area that is substantially smaller in area than the second suction aperture 28, 128 and smaller in area than the first suction aperture 22, 122.

In other further embodiments, a fan assembly comprises a housing 12, 112, 212, 312 and a rotatable, electric fan 44, 144, 244, 344 inside the housing. The housing includes an air inlet 14, 114, 214, 314 and an air guide 18, 118, 218, 318 projecting out from the air inlet. The air guide includes a first wall 18*ae*, 118*ae*, 218*a*, 318*a* and a second wall 18*cf*, 118*cf*, 218*c*, 318*c*, the first and second walls being on opposite sides of the air inlet.

The housing is manually movable from a first stable orientation on a flat environment surface to a second stable orientation on the flat environment surface. The movement can be performed by tilting the housing from the first stable orientation to the second stable orientation, and vice versa. When in the first stable orientation and the fan is rotated at a given velocity, the air inlet 14, 114, 214, 314 is at a first non-zero angle relative to the flat environment surface, and air is drawn into the air inlet either entirely or predominantly through a first air flow-through area 22, 122, 222, 322 between the first wall 18*ae*, 118*ae*, 218*a*, 318*a* and the second wall 18*cf*, 118*cf*, 218*c*, 318*c*.

When in the second stable orientation and the fan is rotated at the given velocity, the air inlet 14, 114, 214, 314 is at a second non-zero angle relative to the flat environment surface, and air is drawn into the air inlet either entirely or predominantly through a second air flow-through area 28, 128, 228, 328 between the first and second walls. The first air flow-through area is substantially greater in area than the second air flow-through area. The first non-zero angle is substantially greater than the second non-zero angle.

Optionally in some embodiments, the first air flow-through area 22, 122, 222, 322 is bounded, at least in part, by a first plurality of edges 20*a-d*, 120*a-d*, 250, 356' of the air guide. Optionally in some embodiments, the edges of the first plurality of edges are coplanar and include an outer edge of the first wall 18*ae*, 118*ae*, 218*a*, 318*a* and an outer edge of the second wall 18*cf*, 118*cf*, 218*c*, 318*c*.

Optionally in some embodiments, the second air flow-through area 28, 128, 228, 328 is bounded, at least in part, by a second plurality of edges 20*d-g*, 120*d-g*, 252, 356" of the air guide. Optionally in some embodiments, the edges 120*d-g*, 252, 356" of the second plurality of edges are coplanar, and the edges include an other outer edge of the first wall 18*ae*, 118*ae*, 218*a*, 318*a* and an other outer edge of the second wall 18*cf*, 118*cf*, 218*c*, 318*c*. Alternatively in some embodiments, the second air flow-through area 28 is entirely bounded by the second plurality of edges 20*d-g*, and the edges of the second plurality of edges 20*d-g* are not coplanar.

In other further embodiments, a fan assembly 400 comprises a housing 412 having first air inlet aperture 422, a second air inlet aperture 428 smaller than the first air inlet aperture, a retainer 476, 478 adjacent the first air inlet aperture, and a retainer 476, 478 adjacent the second air inlet aperture. The fan assembly further comprises a fan inside the housing 412 and a removable cover 474 configured to slide in and out of engagement with the retainer adjacent the first air inlet aperture, and further configured to slide in and out of engagement with the retainer adjacent the second air inlet aperture. The removable cover 474 is configured to completely detach from the housing.

The first air inlet aperture 422 is substantially sealed by the cover 474 when the cover is engaged with the retainer 476, 478 adjacent the first air inlet aperture. The second air inlet aperture 428 is substantially sealed by the cover 474 when the cover is engaged with the retainer 476, 478 adjacent the second air inlet aperture.

Optionally in some embodiments, the retainer adjacent the first inlet aperture 422 includes a first pair of slots 476 formed into the housing 412, and the first pair of slots is configured to slidably engage the cover 474. Optionally in some embodiments, the retainer adjacent the second air inlet aperture 428 includes a second pair of slots 476 formed into the housing, and the second pair of slots is configured to slidably engage the cover 474 when the cover is not slidably engaged with the first pair of slots.

A method of removing smoke or fumes according to embodiments of the present invention will now be described. Although the method is described with reference to FIGS. 1-18, it will be appreciated that structural configurations other than those shown in FIGS. 1-18 can be used to perform the method described below.

A method of smoke/fume removal comprises placing a fan assembly 10, 100, 200, 300, 400 in an area with smoke or fumes in the air, and adjusting the fan assembly to draw air entirely or predominantly through a first air flow-through area 22, 122, 222, 322, 422 between a first wall 18ae, 118ae, 218a, 318a, 418a and a second wall 18cf, 118cf, 218c, 318c, 418c of an air guide of the fan assembly. In a subsequent step, the method further comprises adjusting the fan assembly to draw air entirely or predominantly through a second air flow-through area 28, 128, 228, 328, 428 between first and second walls of the air guide of the fan assembly. The second air flow-through area is substantially different, either substantially smaller or substantially larger, in area than the first air flow-through area.

Optionally in some embodiments, the step of adjusting the fan assembly to draw air entirely or predominantly through the first air flow-through area 422 is performed not by electrical control of the fan, but is performed by sliding a cover 474 over the second air flow-through area 428 and engaging the cover into a pair of slots 476 formed in a housing 412 of the fan assembly 400. Optionally in some embodiments, the step of adjusting the fan assembly to draw air entirely or predominantly through the second air flow-through area 428 is performed not by electrical control of the fan, but is performed by sliding a cover 474 over the first air flow-through area 422 and engaging the cover into an other pair of slots 476 formed in the housing 412.

Optionally in some embodiments, the step of adjusting the fan assembly to draw air entirely or predominantly through the first air flow-through area 22, 122, 222, 322 is performed not by activation of an electrical device or a mechanism, but is performed by placing the fan assembly 10, 100, 200, 300 on a flat environment surface so that second air flow-through area 28, 128, 228, 328 is substantially sealed by the flat environment surface. Optionally in some embodiments, the step of adjusting the fan assembly to draw air entirely or predominantly through the second air flow-through area 28, 128, 228, 328 is performed not by activation of a mechanism or an electrical device, but is performed by placing the fan assembly on the flat environment surface so that first air flow-through area 22, 122, 222, 322 is substantially sealed by the flat environment surface.

Optionally in some embodiments, the step of placing the fan assembly on a flat environment surface so that first air flow-through area 22, 122, 222, 322 is substantially sealed, is performed placing a boundary edge 20a-d, 120a-d, 250, 356' of the first air flow-through area in contact with or in close proximity to the flat environment surface. Optionally in some embodiments, the step of placing the fan assembly on the flat environment surface so that second air flow-through area 28, 128, 228, 328 is substantially sealed, is performed placing a boundary edge 20d-g, 120d-g, 252, 356" of the second air flow-through area in contact with or in close proximity to the flat environment surface.

In some embodiments, the air suction speed can be changed by changing the orientation of the fan assembly to substantially seal either the first or the second air flow-through area. When the second air flow-through area 28, 128, 228, 328 is substantially sealed, air suction into the first air flow-through area 22, 122, 222, 322 will be slower but a relatively large volume will be suctioned over wider direction as compared to when air is being suctioned into the second air flow-through area 28, 128, 228, 328. When the first air flow-through area 22, 122, 222, 322 is substantially sealed, air suction into the second air flow-through area 28, 128, 228, 328 will be faster compared to when air is being suctioned into the first air flow-through area 22, 122, 222, 322. The change in suction speed and volume is accomplished automatically with a change in fan assembly orientation, without a change in fan speed, due to the difference in size of the air flow-through areas.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A fan assembly for removing smoke and fumes, the assembly comprising:
   a housing having an air inlet and an air outlet; and
   a fan inside the housing, the fan covered by the housing, the housing having a first suction aperture and a second suction aperture, the first and second suction apertures in communication with an internal space of the housing, the first and second suction apertures having different suction characteristics,
   wherein the fan and housing are configured to provide suction from at least one of the first suction aperture and the second suction aperture,
   wherein the housing comprises a casing and an air guide, the air inlet and the air outlet formed in the casing, the air inlet being on an inlet side of the casing, the casing covers the fan, the air guide connected to a peripheral edge of the inlet side, the first suction aperture and the second suction aperture formed in the air guide, the internal space disposed in the air guide,
   wherein the air guide includes a bottom wall partially separating the first suction aperture and the second suction aperture, the bottom wall has a constriction aperture that constricts an air flow path from the second suction aperture to the air inlet.

2. The assembly of claim 1, wherein:
the air guide at least partially surrounds the air inlet, the first suction aperture is bounded by a first boundary edge, the second suction aperture is bounded by a second boundary edge,
the first boundary edge is configured to stably support the housing on a flat environment surface, wherein when the first boundary edge stably supports the housing on the flat environment surface, the second suction aperture is exposed,
the second boundary edge is configured to stably support the housing on the flat environment surface, wherein when the second boundary edge stably supports the housing on the flat environment surface, the first suction aperture is exposed,
the second suction aperture has a smaller flow-through area than the first suction aperture.

3. The assembly of claim 2, wherein the first boundary edge is a closed perimeter of the first suction aperture, the second boundary edge is a closed perimeter of the second suction aperture.

4. The assembly of claim 3, wherein the first boundary edge is planar so that the first suction aperture is substantially sealed by the flat environment surface when first boundary edge stably supports the housing on the flat environment surface.

5. The assembly of claim 4, wherein the second boundary edge is planar so that the second suction aperture is substantially sealed by the flat environment surface when the second boundary edge stably supports the housing on the flat environment surface.

6. The assembly of claim 4, wherein the second boundary edge is non-planar so that the second suction aperture is not substantially sealed by the flat environment surface when the second boundary edge stably supports the housing on the flat environment surface.

7. The assembly of claim 2, wherein the air inlet of the casing is disposed between the fan and at least a portion of the air guide, the air guide includes a first wall and a second wall, the first and second walls each project way from the air inlet and the fan, and at least one of the first and second suction apertures is disposed between the first wall and the second wall.

8. The assembly of claim 7, wherein the first boundary edge includes an outer edge of the first wall and an outer edge of the second wall, and the second boundary edge includes another outer edge of the first wall and another outer edge of the second wall.

9. The assembly of claim 7, wherein the first suction aperture is in front of the air inlet of the casing and the second suction aperture is below the air inlet of the casing, the first and second suction apertures are disposed between the first wall and the second wall, and the bottom wall connects the first and second walls to each other.

10. The assembly of claim 1, wherein the air guide projects out from the air inlet of the casing, the air guide has a first wall and a second wall, the first and second walls being on opposite sides of the air inlet, the housing is movable from a first stable orientation on a flat environment surface to a second stable orientation on the flat environment surface,
wherein when the housing is in the first stable orientation and the fan is rotated, air is drawn into the air inlet entirely or predominantly through the first suction aperture, the first suction aperture having a first air flow-through area between the first and second walls, and
wherein when the housing is in the second stable orientation and the fan is rotated, air is drawn into the air inlet entirely or predominantly through the second suction aperture, the second suction aperture having a second air flow-through area between the first and second walls, and the first air flow-through area has a greater area than the second air flow-through area.

11. The assembly of claim 10, wherein the first air flow-through area is bounded, at least in part, by a first plurality of edges of the air guide, the edges of the first plurality of edges are coplanar, and the first plurality of edges includes an outer edge of the first wall and an outer edge of the second wall.

12. The assembly of claim 11, wherein the second air flow-through area is bounded, at least in part, by a second plurality of edges of the air guide, the edges of the second plurality of edges are coplanar, and the second plurality of edges includes another outer edge of the first wall and another outer edge of the second wall.

13. The assembly of claim 11, wherein the second air flow-through area is bounded by a second plurality of edges of the air guide, and the edges of the second plurality of edges are not coplanar.

14. The assembly of claim 1, wherein the bottom wall defines a plane oriented at a non-ninety degree angle relative to a plane defined by the air inlet.

15. A method of removing smoke or fumes, the method comprising:
placing a fan assembly in an area with smoke or fumes in the air;
adjusting the fan assembly to draw air entirely or predominantly through a first air flow through area between first and second walls of an air guide of the fan assembly;
followed by adjusting the fan assembly to draw air entirely or predominantly through a second air flow through area between the first and second walls of the air guide of the fan assembly, the second air flow through area being different in area than the first air flow through area,
adjusting the fan assembly to draw air entirely or predominantly through the first air flow through area is performed by placing a boundary edge of the second air flow through area in contact with or in close proximity to a flat environment surface, and
adjusting the fan assembly to draw air entirely or predominantly through the second air flow through area is performed by placing a boundary edge of the first air flow through area in contact with or in close proximity to the flat environment surface,
wherein the fan assembly includes a casing encasing a fan, an air inlet is formed through the casing, the first wall of the air guide is a first L-shaped wall, the second wall of the air guide is a second L-shaped wall, the first and second L-shaped walls being on opposite sides of the air inlet, the first air flow-through area and the second air flow-through are both between the first and second L-shaped walls.

16. The method of claim 15, wherein the first L-shaped wall projects away from the air inlet, and the second L-shaped wall projects away from the air inlet.

17. The method of claim 15, wherein:
the first and second walls of the air guide are connected to the casing, surround the air inlet, and extend away from the air inlet;
the first air flow through area has an area X;
the second air flow through area has an area Y; and
the air inlet has an area W satisfying the relationship $X > W > Y$.

* * * * *